March 9, 1954

B. E. HOUSE 2,671,535

BRAKE SHOE RETURN SPRING

Filed March 5, 1948

INVENTOR.
BRYAN E. HOUSE
BY
T. J. Plante
ATTORNEY

INVENTOR.
BRYAN E. HOUSE
BY
*D. J. Plante*
ATTORNEY

March 9, 1954   B. E. HOUSE   2,671,535
BRAKE SHOE RETURN SPRING
Filed March 5, 1948   3 Sheets-Sheet 3

INVENTOR.
BRYAN E. HOUSE
BY
T. J. Plante
ATTORNEY

Patented Mar. 9, 1954

2,671,535

UNITED STATES PATENT OFFICE 2,671,535

BRAKE SHOE RETURN SPRING

Bryan E. House, South Bend, Ind., assignor to Bendix Aviation Corporation, South Bend, Ind., a corporation of Delaware Application March 5, 1948, Serial No. 13,202

13 Claims. (Cl. 188—78)

This invention relates to brake shoe return springs, and provides a novel return spring arrangement which has the following advantages over conventional arrangements: (a) It interferes less with the construction and location of the other parts of the brake because it can be located in a relatively unobstructed part of the brake assembly; and (b) It permits each brake shoe to be removed individually for servicing because each return spring is operatively connected only to one shoe.

Other advantages and features of the present invention will become apparent during the following description of a plurality of illustrative embodiments of the invention, reference being had therein to the accompanying drawings, in which:

Figure 1 is an elevational view of a brake assembly which incorporates one form of my novel brake shoe return spring;

Figures 2, 3 and 4 are sections taken on the lines 2—2, 3—3, and 4—4, respectively, of Figure 1;

Figure 1:
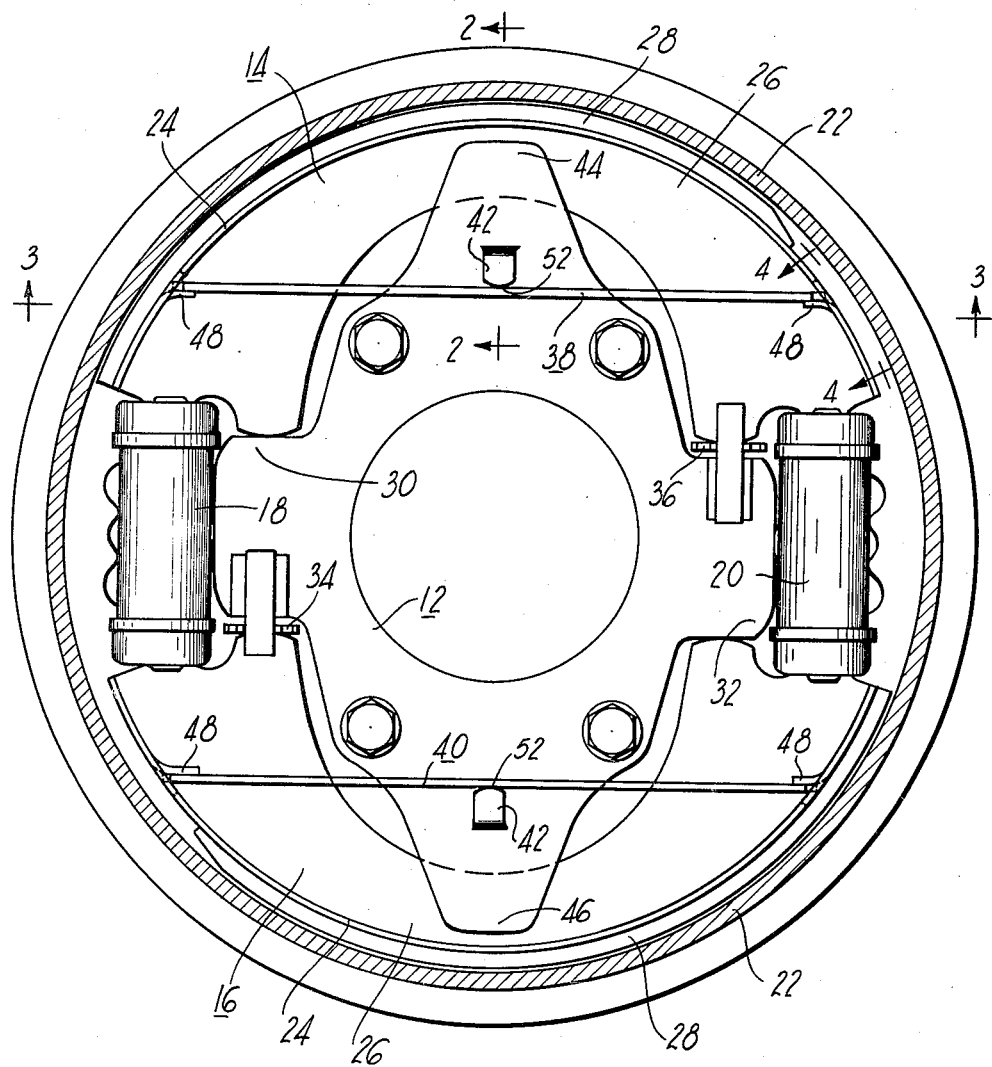
Figure 2:
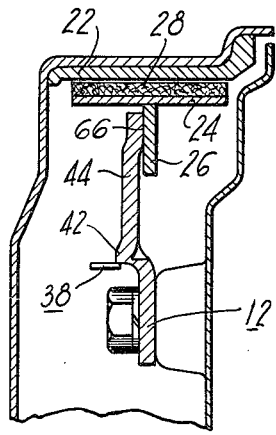

Referring to the drawings, and considering first the embodiment of the invention shown in Figures 1 to 6, the brake assembly includes a supporting plate 12, arcuate brake shoes 14 and 16, and hydraulic actuating cylinders 18 and 20. The general construction and arrangement of the brake form no part of the subject matter of the present invention, and are discussed simply for the purpose of providing the proper background for description of the invention. However, the brake assembly which has been used for the purposes of illustration has certain novel features, which have been made the basis of Patent 2,516,995, issued August 1, 1950. Because a full description of the brake assembly is contained in said application, references herein to certain parts of the brake are very brief.

Each of the hydraulic wheel cylinders 18 and 20 has two pistons (not shown) reciprocable therein, which act against the ends of brake shoes 14 and 16 to move the latter into engagement with the rotatable drum 22, whenever fluid pressure is developed in the wheel cylinders for the purpose of applying the brake. The brake shoes are T-shaped in cross-section, each having a rim 24 and a strengthening web 26. The rim of each shoe has a lining strip 28 secured thereto. The supporting plate 12 has outwardly-extending arms 30 and 32 which receive the anchoring torque of the shoes during braking, and against which the shoes rest in released position. Adjusting screws 34 and 36 may be provided at one end of each shoe to permit adjustment of the released positions of the shoes as the brake linings 28 wear.

The resilient means for biasing the brake shoes 14 and 16 to released position, instead of consisting of the customary helical springs which extend across the brake assembly from one shoe to the other, are constituted by single-leaf flat return springs 38 and 40, each of which is operatively associated with a single brake shoe. Each of the return springs 38 and 40 engages an abutment 42 provided on supporting plate 12. The abutments 42 provide fulcrums for the respective springs, enabling them to exert retracting force on the brake shoes. In the illustrated construction, the abutments 42 are formed as integral nibs which project laterally from shoe-guiding arms 44 and 46 of supporting plate 12. Springs 38 and 40 are so arranged that the shoes will be limited in lateral movement on one side by arms 44 and 46 and on the other side by the springs 38 or 40 respectively.

Figure 4:
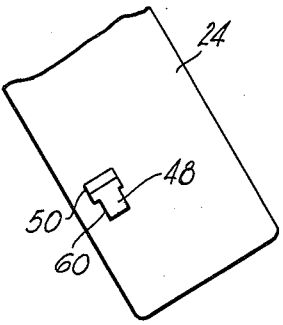
Figure 3:
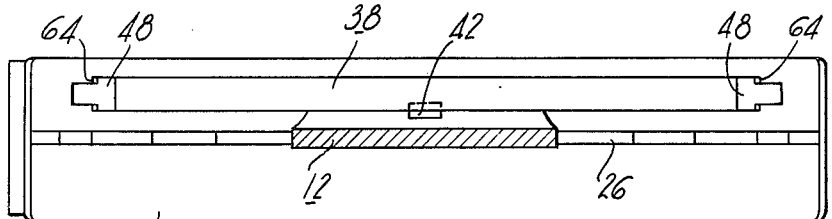

In order to utilize single-leaf return springs, such as springs 38 and 40, it is necessary to provide suitable surfaces of engagement on the brake shoes against which the ends of the springs can act, and to construct the shoes and springs in such a way that the parts can be assembled and dis-assembled with ease. In discussing further details of construction of the shoes and return springs, reference will be had to only one of the shoe and spring combinations, inasmuch as the two shoes and two return springs of the brake are identical. As shown in Figures 1 and 3, the rim 24 of each brake shoe has two integral inwardly-extending ears 48, each of which is located near one end of the respective shoe. The ears 48, which are preferably T-shaped, as shown in Figure 3, are each formed by shearing the rim on three sides of the ear, and then bending the ear away from the rim until it reaches the position shown in Figure 1. This operation leaves a T-shaped slot 50 in the rim, as shown in Figure 4.

Figure 5:
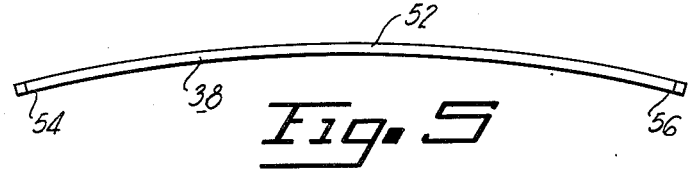
Figure 5 is a side view of the return spring, as it appears before being mounted in the brake assembly.
Figure 6:
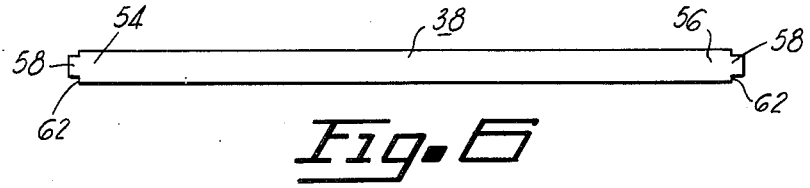
Figure 6 is a plan view of the spring of Figure 5.

Figure 5 shows the curvature of the upper spring 38 before it is mounted in the brake assembly. The point 52 mid-length of the spring engages abutment 42 on the supporting plate when the spring is in position. The ends 54 and 56 of the spring engage the ears 48 on the shoe rim to bias the shoe to released position. As shown in Figure 6, which is a plan view of spring 38, the ends of the spring have narrow portions, or tongues, 58, which extend into the stems 60 of the T-shaped slots 50 in the shoe rim, when the spring is in position. Shoulders 62 formed on spring 38 at the inner ends of tongues 58 are prevented from moving longitudinally with respect to the brake shoe by means of the edges 64 formed at the junctures of the stems and heads of the T-shaped shoe rim slots 50, thereby insuring retention of spring 38 in its proper position once the brake has been assembled.

Spring 38 is assembled by passing it through the head, or wide, portion of whichever slot 50 in the rim of the shoe is uncovered. (It will be noted that the brake lining 28 covers one of the shoe rim slots.) The spring is brought into a position, referring to shoe 14, in which its right end engages the ear 48 at the right end of shoe 14, while a point intermediate its ends engages abutment 42 and the left end of the spring extends somewhat below the ear 48 provided at the left end of shoe 14, owing to the inherent curvature of the spring. Then, by using a suitable tool, such as a pair of pliers, the left end of spring 38 can be bent upwardly until it is above the corresponding ear 48, and the spring can be bodily pulled toward the left to bring it into engagement with said ear. Owing to the fact that the return spring 38 is laterally spaced from the center of the brake shoe, i. e. the spring-engaging ears 48 are nearer to one side of the brake shoe rim than the other, the spring, which is located at the opposite side of shoe-guiding arm 44 from web 26 of the brake shoe, exerts a force on the shoe which holds the shoe web against the surface 66 of the shoe-guiding arm.

Figures 7 to 10 illustrate a brake shoe return spring which is a somewhat modified version of the return spring previously described. In order to simplify the description, the same brake assembly is used as the background for illustration of the modified return spring construction. Like numerals are used to identify the parts of the brake assembly which correspond exactly to parts of the brake shown in Figures 1 to 6.

Return spring 38a, shown in the figures under discussion, is connected to the web of brake shoes 14a, instead of the rim. The shoe web 26a is provided with two apertures 72 located near opposite ends of the shoe. The return spring, as before, engages an abutment 42 provided on the supporting plate 12, at a point mid-length of the spring. The ends of the return spring have laterally-extending arms 74 which pass through the apertures 72 in the shoe web. As shown most clearly in Figure 9, the arms 74 extend slightly beyond the shoe web and are bent back to engage the web, thereby providing the shallow hook-shaped portions 76 which engage the web at 78. The arrangement is such that the hook-shaped portion 76 of each arm 74 deflects laterally while spring 38a is being assembled in the brake, thereby permitting the spring to ride over abutment 42.

Figure 7:
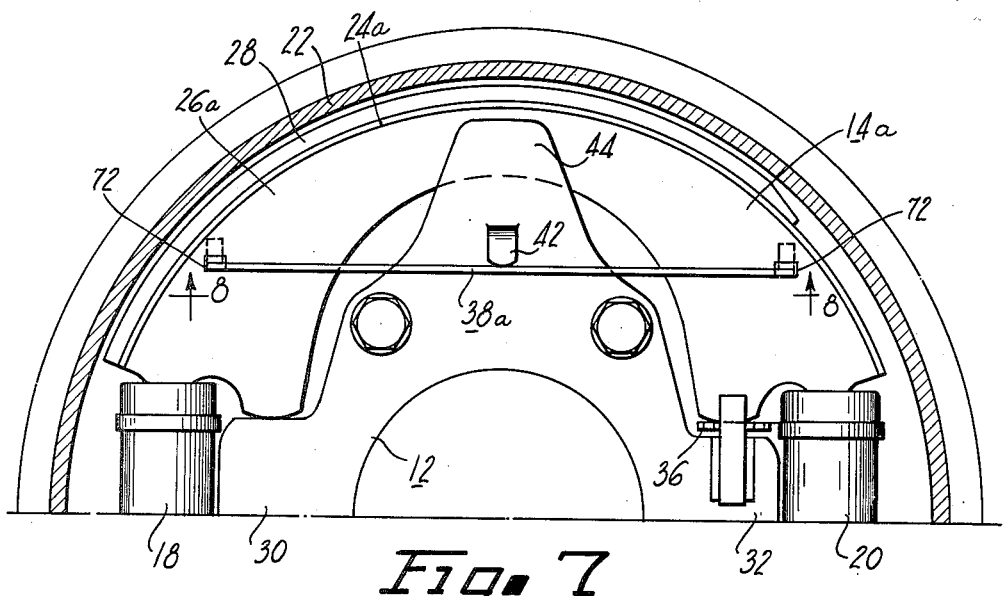
Figure 7 is a partial elevational view of a brake assembly which incorporates a somewhat different form of my novel shoe return spring.
Figure 8:
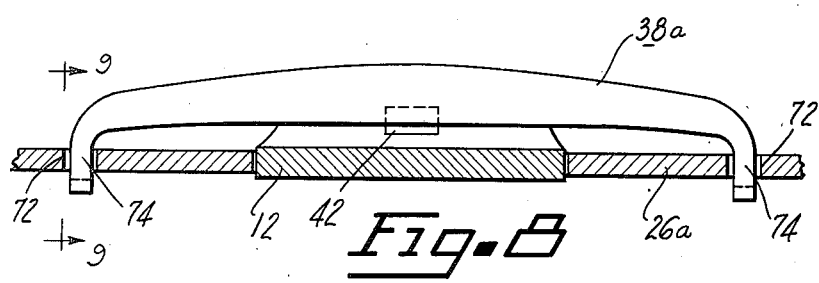
Figure 8 is a section taken on the line 8—8 of Figure 7.
Figure 9:
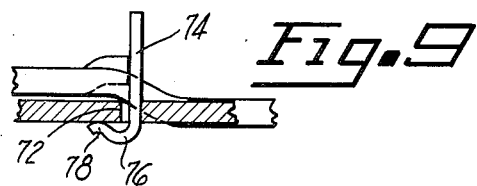
Figure 9 is a section taken on the line 9—9 of Figure 8.
Figure 10:
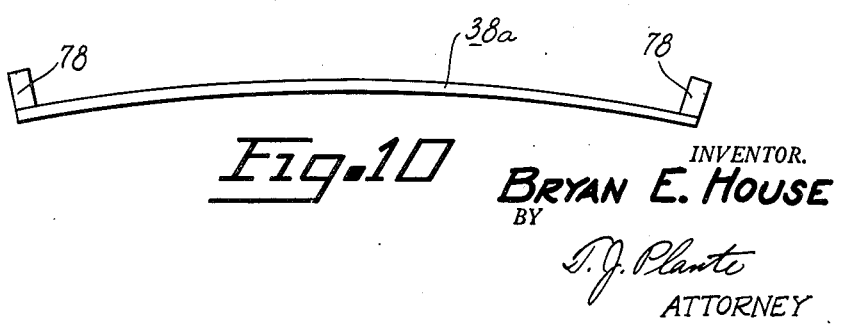
Figure 10 is a side view of the return spring of Figures 7-9, showing it as it appears before it is mounted in the brake assembly.

In assembling spring 38a, the hook-shaped portions 76 of arms 74 are passed through apertures 72, and then the spring is rotated toward the position shown in Figures 7 to 9. The center of the spring has to be pried over the abutment 42 until it falls into the proper assembled position. In forcing the spring over abutment 42, the hook-shaped portions 76 of arm 74 are deflected laterally against their resilient resistance to permit the necessary lateral displacement of the center of the spring until it snaps into assembled position. When the springs are snapped into their assembled position the lateral movement of the shoes is limited in one direction by arms 44 and 46 and in the other direction by the springs 38 and 40.

From the foregoing description of two illustrative embodiments of the invention, it should be apparent that the advantages claimed for the invention are clearly attributable to it. Because each single-leaf shoe return spring acts on both ends of the given brake shoe, each shoe and its return spring form a unit in the brake assembly which can be individually removed and replaced. Furthermore, the present return spring can be fitted into the available space in a brake assembly much more easily than the conventional helical spring. This is true because the single-leaf spring disclosed in the present application extends parallel to the length of the shoe, and does not extend across the brake assembly from one shoe to the other as the conventional spring. Because the space between the shoes has to accommodate the brake actuating mechanism and the anchors for the shoes, it is sometimes very difficult to find space for return springs of the conventional type. The trend towards wheels and brakes of smaller diameter accentuates this problem.

Although certain particular embodiments of my invention have been described, it will be understood by those skilled in the art that the objects of the invention may be attained by the use of constructions different in certain respects from those disclosed without departing from the underlying principles of the invention.

I claim:

1. In a brake, a supporting plate having an outwardly-extending shoe-guiding arm, said arm having an abutment formed thereon to serve as a fulcrum for a shoe return spring, an arcuate T-section brake shoe mounted on said supporting plate, the web of said shoe engaging the side of said shoe-guiding arm opposite the fulcrum-providing abutment, the rim of the shoe having two T-shaped slots formed therein near opposite ends thereof by bending integral T-shaped ears inwardly from the body of the rim until they lie in substantially the same plane, and a single-leaf flat shoe-return spring which engages the abutment on the shoe-guiding arm midlength of the spring, the ends of said spring engaging the T-shaped ears formed on the shoe rim to bias the shoe to released position, said spring ends having tongues which extend into the stems of the T-shaped slots in the shoe rim whereby separation of said spring from said shoe is prevented, said spring ends also having shoulders at the inner ends of the tongues which are prevented from moving longitudinally by the edges formed at the junctures of the stems and heads of the T-shaped shoe rim slots.

2. In a brake, a supporting plate having an abutment thereon which serves as a fulcrum for a shoe return spring, an arcuate T-section brake shoe mounted on said supporting plate, the rim of the shoe having two T-shaped slots formed therein near opposite ends thereof by bending integral T-shaped ears inwardly from the body of the rim until they lie in substantially the same plane, and a single-leaf flat shoe-return spring which engages the abutment on the supporting plate midlength of the spring, the ends of said spring engaging the T-shaped ears formed on the shoe rim to bias the shoe to released position, said spring ends having tongues which extend into the stems of the T-shaped slots in the shoe rim and having shoulders at the inner ends of the tongues which are prevented from moving longitudinally by the edges formed at the junctures of the stems and heads of the T-shaped shoe rim slots.

3. In a brake, a supporting plate having an abutment thereon which serves as a fulcrum for a shoe return spring, an arcuate T-section brake shoe mounted on said supporting plate, the rim of the shoe having two T-shaped slots formed therein near opposite ends thereof by bending integral T-shaped ears inwardly from the body of the rim until they lie in substantially the same plane, and a single-leaf flat shoe-return spring which engages the abutment on the supporting plate midlength of the spring, the ends of said spring engaging the T-shaped ears formed on the shoe rim to bias the shoe to released position, said spring ends having tongues which extend into the stems of the T-shaped slots in the shoe rim and having shoulders at the inner ends of the tongues which are prevented from moving longitudinally by the edges of the stems of the shoe rim slots.

4. In a brake, a supporting plate having an abutment thereon which serves as a fulcrum for a shoe return spring, an arcuate T-section brake shoe mounted on said supporting plate, the rim of the shoe having two slots formed therein near opposite ends thereof by bending integral ears inwardly from the body of the rim until they lie in substantially the same plane, and a single-leaf flat shoe-return spring which engages the abutment on the supporting plate midlength of the spring, the ends of said spring extending into the shoe-rim slots and having shoulders engageable with the underside of the rim to prevent longitudinal movement of the spring, said ends engaging the ears formed on the shoe rim to bias the shoe to released position.

5. In a brake, a supporting plate having an abutment thereon which serves as a fulcrum for a shoe return spring, an arcuate T-section brake shoe mounted on said supporting plate, the rim of the shoe having two integral inwardly-extending ears near opposite ends thereof, and a single-leaf flat shoe-return spring which engages the abutment on the supporting plate midlength of the spring, both end portions of said spring engaging the ears on the shoe rim to bias the shoe to released position and being engageable with the underside of the rim to prevent longitudinal movement of the spring.

6. In a brake, a supporting member having a fulcrum for a shoe return spring provided thereon, an arcuate T-section brake shoe mounted on said supporting member, the rim of the shoe having two inwardly extending ears near opposite ends thereof, and a single-leaf flat shoe-return spring which engages the fulcrum on the supporting member midlength of the spring, both end portions of said spring engaging the ears on the shoe rim to bias the shoe to released position and being engageable with the rim to prevent longitudinal movement of the spring.

7. In a brake, a supporting plate having an outwardly-extending shoe-guiding arm, said arm having an abutment thereon which serves as a fulcrum for a shoe return spring, an arcuate T-section brake shoe mounted on said supporting plate, the web of said shoe engaging the side of said shoe-guiding arm opposite the fulcrum-providing abutment, said web having two apertures therein near opposite ends thereof, and a single-leaf flat shoe-return spring which engages the abutment on the shoe-guiding arm midlength of the spring, the ends of said spring having laterally-extending arms which pass through the apertures in the shoe web and which act on the shoe to bias it to released position, said arms extending slightly beyond the shoe web and being bent back to engage the web, in order to permit resilient lateral deflection of the spring while it is being assembled.

8. In a brake, a supporting plate having a shoe-guiding member provided with an abutment thereon which serves as a fulcrum for a shoe return spring, an arcuate T-section brake shoe mounted on said supporting plate, the web of said shoe having two apertures therein near opposite ends thereof, and a single-leaf flat shoe-return spring which engages the abutment on the supporting plate midlength of the spring, the ends of said spring having laterally-extending arms which pass through the apertures in the shoe web and which act on the shoe to bias it to released position, said arms extending slightly beyond the shoe web and being bent back to engage the web, in order to permit resilient lateral deflection of the spring while it is being assembled.

9. In a brake, a supporting plate having a shoe guiding member provided with an abutment thereon which serves as a fulcrum for a shoe return spring, an arcuate T-section brake shoe mounted on said supporting plate, the web of said shoe having two apertures therein near opposite ends thereof, and a single-leaf flat shoe-return spring which engages the abutment on the supporting plate midlength of the spring, the ends of said spring having laterally-extending arms which pass through the apertures in the shoe web and which act on the shoe to bias it to released position, said arms extending slightly beyond the shoe web and being bent back to engage the web.

10. In a brake, a supporting plate having an abutment thereon which serves as a fulcrum for a shoe return spring, an arcuate T-section brake shoe mounted on said supporting plate, a shoe guiding member for cooperatively defining the lateral position of said shoe, the web of said shoe having two apertures therein near opposite ends thereof, and a single-leaf flat shoe-return spring which engages the abutment on the supporting plate midlength of the spring, the ends of said spring having laterally-extending arms which pass through the apertures in the shoe web and which act on the shoe to bias it to released position.

11. In a brake having a supporting member with shoe guiding arms provided with a fulcruming abutment for a shoe return spring and a T-section brake shoe mounted on said supporting member and laterally supported thereon, the web of said shoe consisting of a flat plate and laterally supported thereon having two apertures therein near opposite ends thereof; a single-leaf flat shoe-return spring which engages the abutment on the supporting member midlength of the spring and which has end portions laterally offset to extend through the apertures in the shoe web to bias the shoe to released position.

12. In a brake, a supporting member having a lateral shoe-guiding member thereon, an abutment integrally formed on said shoe-guiding member, an arcuate brake shoe mounted on said supporting member and engaging the side of said shoe-guiding member opposite said abutment to be held against movement in one direction, said shoe having an opening near each end thereof, a shoe-return-spring-engaging surface adjacent each of said openings, and a single-leaf flat shoe-return spring which engages said abutment intermediate its length and having its ends guided in said openings to act on said surfaces and to bias the shoe to released position, said spring by its engagement with said abutment tending to produce pivotal movement of the center portion thereof, thereby urging the web portion of the shoe into engagement with said shoe guiding member for limiting movement of said shoe in either lateral direction.

13. In a brake, a supporting plate having an outwardly-extending shoe-guiding arm, said arm having an abutment formed thereon to serve as a fulcrum for a shoe return spring, an arcuate T-section brake shoe mounted on said supporting plate, the web of said shoe engaging the side of said shoe-guiding arm opposite the fulcrum-providing abutment, said arcuate brake shoe having an opening in each end portion thereof, and a single-leaf flat shoe-return spring which engages between its ends said abutment, each end of said spring projecting into a corresponding one of said openings to be operatively connected to the corresponding end of said shoe whereby said shoe will have limited lateral movement in one direction by engagement of said spring with said arm and in the opposite direction by engagement of said web with said arm, said spring biasing said shoe to released position and also tending to produce lateral turning of the center portion of said shoe thereby urging the web thereof into engagement with said arm.

BRYAN E. HOUSE.

References Cited in the file of this patent

UNITED STATES PATENTS

| Number | Name | Date |
|---|---|---|
| 1,353,914 | Keyes | Sept. 28, 1920 |
| 1,417,069 | Howell | May 23, 1922 |
| 1,693,444 | Hopkins | Nov. 27, 1928 |
| 2,475,491 | Goepfrich et al. | July 5, 1949 |
| 2,516,995 | House | Aug. 1, 1950 |
| 2,595,143 | House | Apr. 29, 1952 |

FOREIGN PATENTS

| Number | Country | Date |
|---|---|---|
| 252,474 | Great Britain | June 3, 1926 |
| 574,103 | Great Britain | Dec. 20, 1945 |